United States Patent [19]

Plummer

[11] Patent Number: 4,765,926
[45] Date of Patent: Aug. 23, 1988

[54] SURFACTANT COMPOSITIONS AND METHOD THEREFOR

[75] Inventor: Daniel T. Plummer, Ponca City, Okla.

[73] Assignee: Vista Chemical Company, Houston, Tex.

[21] Appl. No.: 840,939

[22] Filed: Mar. 18, 1986

[51] Int. Cl.⁴ .................. B01F 17/04; B01F 17/12; C09K 7/02
[52] U.S. Cl. .................. 252/352; 252/353; 252/8.513; 252/358
[58] Field of Search .......... 252/352, 353, 8.511, 252/8.513, 358, 351

[56] References Cited

U.S. PATENT DOCUMENTS

| | | | |
|---|---|---|---|
| 3,391,750 | 7/1968 | Zika | 252/353 X |
| 4,140,642 | 2/1979 | Kistler et al. | 252/353 X |
| 4,162,989 | 7/1979 | Flournoy et al. | 252/352 X |
| 4,192,767 | 3/1980 | Flournoy et al. | 252/352 X |
| 4,310,471 | 1/1982 | Oswald et al. | 252/353 X |
| 4,374,104 | 2/1983 | Primack | 252/351 X |
| 4,457,762 | 7/1984 | Papalos | 252/353 X |
| 4,476,037 | 10/1984 | Ploog et al. | 252/353 X |
| 4,502,868 | 3/1985 | Yaghmaie et al. | 252/353 X |
| 4,514,189 | 4/1985 | Papalos et al. | 252/353 X |
| 4,549,881 | 10/1985 | Mathiesen et al. | 252/351 X |

FOREIGN PATENT DOCUMENTS 158486 10/1985 European Pat. Off. .

OTHER PUBLICATIONS

Wade, et al. "Low Interfacial Tensions Involving Mixtures of Surfactants", Soc. of Petrol. Engr. J., Apr. 1977, pp. 122–128.

Cooper et al, "Sodium Alkylbenzene Sulfonates from Phenols", J. Chem. Engr. Data, vol. 15, No. 4, 1970.

Primary Examiner—John F. Terapane
Assistant Examiner—Catherine S. Kilby
Attorney, Agent, or Firm—Browning, Bushman, Zamecki & Anderson

[57] ABSTRACT

A surfactant composition comprising from about 30 to about 50% by weight of a sulfated alkoxylated alcohol, an effective amount of an alkyl aryl sulfonate and an effective amount of a water soluble salt of a divalent acid, the composition being flowable or pumpable at normal handling temperatures.

39 Claims, No Drawings

SURFACTANT COMPOSITIONS AND METHOD THEREFOR

BACKGROUND OF THE INVENTION

The present invention relates to surfactant compositions and, more particularly, to flowable or pumpable compositions containing sulfated alkoxylated alcohols.

Sulfated alkoxylated alcohols (ES) are used in many detergent applications. Substantially water free sulfated alkoxylated alcohols, particularly those containing greater than 5 moles of ethylene oxide per mole of alcohol, range from viscous liquids to gel like materials and are generally unpumpable or non-fluid at normal handling temperatures in the range of 110° to 120° F. For ease of shipment and handling, it is desired that the ES materials be formulated into a fluid or pumpable form so that they can more easily and economically be converted into detergent end product. Generally speaking, aqueous ES compositions containing 25–30% by weight of the ES material in water are fluid. However, these "low active" liquid compositions are undesirable for several reasons. For one, because the concentration of the ES is so low, it requires excessive freight costs since more of the aqueous composition must be shipped in order to obtain the desired quantity of the active ingredient, i.e. the ES material. Additionally, since the compositions contain such large quantities of water, there are excessive energy costs in connection with spray drying to remove the water to obtain solids for incorporation into detergent powders. There are also restrictions upon the amount of other water containing ingredients used in formulating a mixture for spray drying to a detergent powder which make such "low active" compositions undesirable.

Preferably, an ES composition which contains from about 30 to about 50% by weight of the sulfated alkoxylated alcohol would be desirable since it would overcome the disadvantages discussed above with respect to the low active compositions. Unfortunately, in the past it has been found that attempts to formulate compositions containing in excess of about 30% by weight ES material resulted in a material that yielded either a rigid gel or a highly viscous fluid which, in any event, was essentially unpumpable or non-fluid under normal handling conditions, i.e. from about 110° F. to 120° F.

It is known to add lower alcohols, e.g. methanol, ethanol, etc., to high active ES solutions in order to reduce the viscosity and render them fluid or pumpable. However, the addition of such lower alcohols is undesirable since, in the spray drying operation to recover the ES product, the alcohols, which are vented from the spray dryer, must be recovered to minimize potential environmental problems meaning that the spray drying operation becomes more expensive.

SUMMARY OF THE INVENTION

It is therefore an object of the present invention to provide a novel surfactant composition.

Another object of the present invention is to provide a surfactant composition containing sulfated alkoxylated alcohol which is pumpable.

Still another object of the present invention is to provide a surfactant composition comprising water and at least 30% by weight sulfated alkoxylated alcohol which is pumpable and free flowing at normal handling temperatures.

A further object of the present invention is to provide a method of forming a free flowing, sulfated alkoxylated alcohol containing greater than 30% by weight ES material.

The above and other objects of the present invention will become apparent from the description given herein and the appended claims.

The surfactant composition of the present invention comprises a sulfated alkoxylated alcohol, an effective amount of an alkyl aryl sulfonate, and an effective amount of an inorganic, water soluble salt of a divalent acid such as carbonic acid or sulfuric acid, all of the above-named ingredients being present in an aqueous medium.

The process of the present invention includes sulfating, with sulfur trioxide and other suitable sulfating agent, an alkoxylated alcohol to produce the sulfate ester, principally the half ester, of the alkoxylated alcohol followed by the addition of an alkyl aryl sulfonate or an alkyl aryl sulfonic acid and an inorganic, water soluble salt of a divalent acid, and an aqueous mixture of a basic material in sufficient concentration to neutralize the sulfate ester. In the case where the sulfonate is used, the sulfonate and aqueous mixture of the basic material must be added together to prevent degradation of the half ester.

DESCRIPTION OF THE PREFERRED EMBODIMENTS

The surfactants to which the composition of the present invention are directed and the sulfated alkoxylated alcohols having the formula:

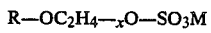

$$R-OC_2H_4-_xO-SO_3M \qquad \text{I.}$$

wherein R is an alkyl radical having from about 10 to about 16 carbon atoms, x is from about 5 to about 9, M is a monovalent cation selected from the class consisting of alkali metal ions, ammonium ion and mixtures thereof. Preferably, the alkyl group will have from about 12 to about 14 carbon atoms. The alcohol from which the alkyl radical is derived can be either synthetic or of natural origin as is well known to those skilled in the art. Non-limiting examples of naturally occurring fatty alcohols useful in the present invention include dodecyl alcohol, myristyl alcohol, cetyl alcohol, capryl alcohol, etc. The alkyl radical, i.e. the R group, can be either straight chain or branched chain although it is preferred that it be primarily straight chain. Preferably, the alkyl group is straight chain containing no more than approximately 15% branched chain material.

The alcohols forming the R group of the sulfated alkoxylated alcohols can be ethoxylated in the well known fashion such as described, for example, in U.S. Pat. Nos. 3,297,412; 3,770,701; 3,894,093 and 3,956,401, incorporated herein by reference for all purposes.

Particularly preferred as a starting product alcohol for preparation of the sulfated alkoxylated alcohols is a mixture of $C_{12}$–$C_{14}$ alcohols containing approximately 35% by weight $C_{12}$ alcohols and 65% by weight $C_{14}$ alcohols with approximately 99% of said alcohols being linear.

While the sulfated alkoxylated alcohol can contain from about 5 to about 9 ethoxy groups per mole, it is preferred that the sulfated alkoxylated alcohols contain from about 6 to about 8 ethoxy groups per mole of sulfated ethoxylated alcohol. Especially desirable is a sulfated ethoxylated alcohol utilizing the $C_{12}$–$C_{14}$ alcohols starting material noted above and having an average of about 6.7 ethoxy groups per mole of sulfated alkoxylated alcohol.

Sulfating of the ethoxylated alcohols can be carried out in the well known manner by methods such as those taught in U.S. Pat. Nos. 3,227,145; 3,309,392; 3,395,170 and 3,775,407, incorporated herein by reference for all purposes. The sulfated alkoxylated alcohol, in the final composition, will be present in the form of a salt thereof, the salt including a monovalent cation which is selected from the class consisting of alkali metal ions, ammonium ion and mixtures thereof. Preferably, because of solubility and ready availability, it is preferred that the cation be sodium ion or ammonium ion.

The sulfated alkoxylated alcohol will be present in the composition of the present invention in an amount greater than about 30% by weight, preferably from about 30% to about 50% by weight of the composition.

The composition of the present invention also contains an alkyl aryl sulfonate having the general formula:

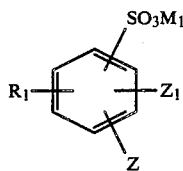

II.

wherein $R_1$ is an alkyl radical having from about 10 to about 15 carbon atoms, preferably from about 12 to about 14 carbon atoms, Z and $Z_1$ are hydrogen or an alkyl group having up to 2 carbon atoms, and $M_1$ is a monovalent cation selected from the class consisting of alkali metal ions, ammonium ion and mixtures thereof. The alkyl aryl sulfonates contemplated by the present invention include those in which the alkyl radical, i.e. the R group, is linear or branched chain and includes such compounds as sodium tridecylbenzene sulfonate, sodium dodecylbenzene sulfonate, sodium tetradecylbenzene sulfonate, sodium tridecyltoluene sulfonate, sodium tridecylxylene sulfonate, etc. The alkyl aryl sulfonate will be present in an effective amount, i.e. an amount which when combined with the inorganic, water salt described hereafter, will provide a fluid or pumpable composition, in an aqueous medium, under normal handling conditions. Preferably, the alkyl aryl sulfonate will be present in an amount of about 7% or greater, preferably from about 7 to about 30% by weight of the composition.

In addition to the sulfated alkoxylated alcohol and the alkyl aryl sulfonate, the composition of the present invention also includes an inorganic, water soluble salt of a divalent acid. Suitable non-limiting examples of divalent acids include sulfuric acid, carbonic acid, etc. Preferably, the water soluble salt includes a cation selected from the class consisting of alkali metal ions, ammonium ion and mixtures thereof. Thus, salts such as sodium carbonate, sodium sulfate, ammonium carbonate, ammonium sulfate, potassium sulfate, etc. are suitable for use as the inorganic, water soluble salt of the present invention. The water soluble salt is present in the composition in an effective amount, an effective amount being that amount which, when combined with the alkyl aryl sulfonate, will maintain the alkylated sulfonated alcohol in a flowable, pumpable or fluid condition in an aqueous medium. It will be apparent that the amount of the water soluble salt will depend upon the amount and composition of the sulfated alkoxylated alcohol and the amount of the alkyl aryl sulfonate present in the composition. Generally, however, the water soluble salt is present in an amount of from about 3 to about 7% by weight of the composition.

In forming the compositions of the present invention, an alkyl aryl sulfonic acid can be employed rather than the alkyl aryl sulfonate described above. Thus, when the alkyl aryl sulfonic acid is employed, $M_1$ noted above in Formula II would be hydrogen rather than one of the cations described. The order of addition of the ingredients in the process of the present invention is important. It is well known that when alkoxylated alcohols are sulfated, such as by the use of sulfur trioxide or other sulfating agents, the sulfate ester, and more particularly the half ester, is initially formed. This sulfate ester is generally unstable and will rapidly degrade unless neturalized to form the salt. This is conventionally done by the combination of the sulfate ester with an aqueous medium containing a basic material in an amount sufficient to neutralize the sulfate ester. While the basic material can be present in stoichimetric amounts, it is preferable that an excess of the basic material or neutralizing agent be present to insure that none of the ester form remains which might degrade and effect the properties, particularly color, or composition of the final end product.

It is important that the sulfated ester not be neutralized prior to addition of the other ingredients. Once the sulfated alkoxylated alcohol has been neutralized, and if it is present in an aqueous mixture in an amount of about 30% or greater by weight, the mixture becomes a highly viscous or gel-like material which is not fluid or pumpable and, accordingly, cannot be handled under conventional handling procedures or temperatures, e.g. between about 110° to about 120° F. Thus, in the case where the alkyl aryl sulfonate is employed, several variations of the process of the present invention may be utilized. The inorganic, water soluble salt can be added to the substantially anhydrous sulfated alkoxylated alcohol in ester form followed by the rapid combination of the alkyl aryl sulfonate in admixture with the aqueous medium containing the basic material or neutralizing agent. Preferably, the inorganic water soluble salt, the alkyl aryl sulfonate and the aqueous medium containing the neutralizing agent are mixed together, prior to the combination with the sulfate ester.

In the case where the alkyl aryl sulfonic acid rather than sulfonate is employed, it is possible to add the sulfonic acid and the inorganic, water soluble salt to the sulfated alkoxylated alcohol in ester form, and them combine this mixture with an aqueous medium containing a neutralizing agent. Alternately, and preferably, the sulfonic acid, the inorganic, water soluble salt and the aqueous medium containing the neutralizing agent can be added together prior to combination with the sulfate ester.

The neutralizing agent or basic material can be any of those conventionally used in the sulfation process such as, for example, aqueous solutions of sodium hydroxide, ammonium hydroxide, etc.

To more fully illustrate the present invention, the following non-limiting examples are presented.

EXAMPLE 1

The alkoxylated alcohol used was one wherein the alkyl group had a distribution of 35% $C_{12}$, 65% $C_{14}$ with approximately 1% of the alkyl groups being branched chain. The alkoxylated alcohol had an ethylene oxide content of 59% by weight (approximately 6.7 ethoxy groups per mole of alcohol). Samples of the alkoxylated alcohol were sulfated with sulfur trioxide in the conventional manner to produce the sulfate ester. Immediately after each sulfation was completed, the mixture containing the sulfate ester of the alkoxylated alcohol was admixed with sodium tridecylbenzene sulfonate (LAS) and sodium sulfate in a caustic solution (Sample Nos. 1–4, 10 and 11), sodium tridecylbenzene sulfonate in a caustic solution (Sample Nos. 5 and 7) sodium sulfate in a caustic solution (Sample Nos. 6 and 8), or a caustic solution alone (Sample No. 9). In all cases the caustic solution contained an excess of NaOH necessary to neutralize the sulfate ester. The appearance and viscosity of the resulting samples was observed. The results are given in Table 1 below.

TABLE 1

| SAMPLE NUMBER | TARGET % ES | TARGET % LAS | TARGET % $NA_2SO_4$ | ACTUAL % ES | ACTUAL % LAS | ACTUAL % $NA_2SO_4$ | % FREE OIL* | APPEARANCE AT 130° F. | BROOKFIELD VISCOSITY (#4 SPINDLE, 60 RPM) AT 110° F. | AT 130° F. |
|---|---|---|---|---|---|---|---|---|---|---|
| 1 | 35 | 10 | 4 | 36.7 | 12.1 | 4.2 | 2.1 | Mobile slurry | 5300 | 6650 |
| 2 | 35 | 10 | 4 | 37.4 | 11.0 | 3.9 | 1.1 | Mobile slurry | >10000 | 2850 |
| 3 | 45 | 10 | 4 | 46.3 | 11.2 | 4.2 | 2.1 | Mobile slurry | 8300 | 7150 |
| 4 | 45 | 10 | 4 | 39.6 | 8.8 | 5.8 | 2.8 | Mobile slurry | >10000 | 9200 |
| 5 | 35 | 10 | 0 | — | — | — | — | Firm paste | — | — |
| 6 | 35 | 0 | 10 | — | — | — | — | Soft paste & watery layer | — | — |
| 7 | 45 | 10 | 0 | — | — | — | — | Hard paste | — | — |
| 8 | 45 | 0 | 10 | — | — | — | — | Hard paste | — | — |
| 9 | 35 | 0 | 0 | — | — | — | — | Hard paste | — | — |
| 10 | 35 | 3 | 4 | — | — | — | — | 2-Phase soft paste | — | — |
| 11 | 45 | 3 | 4 | — | — | — | — | Hard paste | — | — |

*Unsulfated material.

As can be seen from Table 1 above, Samples 1–4 containing both LAS and sodium sulfate produced a mobile slurry, i.e. were pumpable or fluid at temperatures of 130° F. or less. As can also be seen, Samples 5–11, which contained either LAS or sodium sulfate or no additives, or insufficient amounts of LAS are non-fluid and were found to remain non-fluid even up to temperatures of around 150° F. At sustained temperatures of about 150° F., these materials began to develop colored by-products making them less desirable for end use detergents.

EXAMPLE 2

The procedure of Example 1 was followed with the exception that the final composition contained 35% by weight ES, 10% by weight LAS and 4% by weight sodium carbonate. It was found that this composition provided a mobile foamy slurry at between 110° and 130° F.

It can be seen from the above data that the present invention provides a sulfated alkoxylated alcohol composition containing greater than 30% by weight of the sulfated alcohol which is pumpable or flowable.

The invention may be embodied in other specific forms without departing from the spirit or essential characteristics thereof. The foregoing embodiments are therefore to be considered, in all respects, as illustrative and not restrictive, the scope of the invention being indicated by the appended claims rather than by the foregoing description, and all changes which come within the meaning and range of equivalence of the claims are therefore intended to be embraced therein.

What is claimed is:

1. A surfactant composition comprising:
   from about 30 to about 50% by weight of said composition of a sulfated alkoxylated alcohol having the formula:

R—$OC_2H_4$—$_xO$—$SO_3M$ wherein R is an alkyl radical having from about 10 to about 16 carbon atoms, x is from about 5 to about 9, M is a monovalent cation selected from the class consisting of alkali metal ions, ammonium ion and mixtures thereof;
   from about 7 to about 30% by weight of an alkyl aryl sulfonate having the general formula:

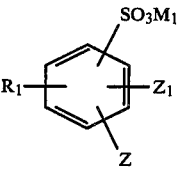

where $R_1$ is an alkyl radical having from about 10 to about 15 carbon atoms, Z and $Z_1$ are hydrogen or an alkyl group having up to 2 carbon atoms, and $M_1$ is a monovalent cation selected from the class consisting of alkali metal ions, ammonium ion and mixtures thereof; and
   from about 3 to about 7% by weight of an inorganic, water soluble salt of a divalent acid.

2. The composition of claim 1 wherein R is an alkyl radical having from about 12 to about 14 carbon atoms.

3. The composition of claim 1 wherein x is from about 6 to about 8.

4. The composition of claim 1 wherein $R_1$ has from about 12 to about 14 carbon atoms.

5. The composition of claim 1 wherein Z and $Z_1$ are hydrogen.

6. The composition of claim 1 wherein Z is hydrogen and $Z_1$ is a methyl group.

7. The composition of claim 1 wherein Z and $Z_1$ are methyl groups.

8. The composition of claim 1 wherein said water soluble salt comprises a cation selected from the class consisting of alkali metal ions, ammonium ion and mixtures thereof.

9. The composition of claim 1 wherein said divalent acid is selected from the class consisting of carbonic acid, sulfuric acid and mixtures thereof.

10. The composition of claim 1 wherein said alkyl aryl sulfonate comprises sodium tridecylbenzene sulfonate.

11. The composition of claim 1 wherein said salt comprises sodium sulfate.

12. A method of forming a surfactant composition comprising:

sulfating an alkoxylated alcohol having the formula:

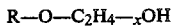

wherein R is an alkyl radical having from about 10 to about 16 carbon atoms and x is from about 5 to about 9 to provide a mixture containing about 30% by weight or greater of the sulfate ester of said alkoxylated alcohol;

combining with said mixture an effective amount of an alkyl aryl sulfonic acid having the general formula:

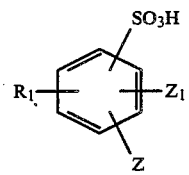

wherein $R_1$ is an alkyl radical having from about 10 to about 15 carbon atoms, Z and $Z_1$ are hydrogen or an alkyl group having up to two carbon atoms;

combining with said mixture an effective amount of an inorganic, water soluble salt of a divalent acid; and combining with said mixture an aqueous medium containing a basic material in an amount sufficient to neutralize said sulfate ester, said sulfate ester not being neutralized prior to combining with said alkyl aryl sulfonic acid and said water soluble salt.

13. The method of claim 12 wherein said alkyl aryl sulfonic acid is present in an amount of from about 7 to about 30% by weight.

14. The method of claim 12 wherein said water soluble salt is present in an amount of from about 3 to about 7% by weight.

15. The method of claim 12 wherein R is an alkyl radical having from about 12 to about 14 carbon atoms.

16. The method of claim 12 wherein x is from about 6 to about 8.

17. The method of claim 12 wherein $R_1$ has from about 12 to about 14 carbon atoms.

18. The method of claim 12 wherein Z and $Z_1$ are hydrogen.

19. The method of claim 12 wherein Z is hydrogen and $Z_1$ is a methyl group.

20. The method of claim 12 wherein Z and $Z_1$ are methyl groups.

21. The method of claim 12 wherein said water soluble salt comprises a cation selected from the class consisting of alkali metal ions, ammonium ion and mixtures thereof.

22. The method of claim 12 wherein said divalent acid is selected from the class consisting of carbonic acid, sulfuric acid and mixtures thereof.

23. The method of claim 12 wherein said alkyl aryl sulfonic acid comprises sodium tridecylbenzene sulfonic acid.

24. The method of claim 12 wherein said salt comprises sodium sulfate.

25. The method of claim 12 wherein said sulfonic acid, said water soluble salt and said aqueous medium are added together.

26. A method of forming a surfactant composition comprising:

sulfating an alkoxylated alcohol having the formula:

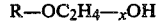

wherein R is an alkyl radical having from about 10 to about 16 carbon atoms and x is from about 5 to about 9, to provide a mixture containing about 30% by weight or greater of the sulfate ester of said alkoxylated alcohol;

combining with said mixture an effective amount of an inorganic, water soluble salt of a divalent acid;

combining with said mixture an effective amount of an alkyl aryl sulfonate having the general formula:

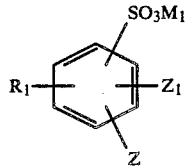

wherein $R_1$ is an alkyl radical having from about 10 to about 15 carbon atoms, Z and $Z_1$ are hydrogen or an alkyl group having up to 2 carbon atoms, and $M_1$ is a monovalent cation selected from the class consisting of alkali metal ions, ammonium ion and mixtures thereof; and combining with said mixture an aqueous medium containing a basic material in an amount sufficient to neutralize said sulfate ester, said alkyl aryl sulfonate and said aqueous medium containing said basic material being added together.

27. The method of claim 26 wherein said alkyl aryl sulfonate is present in an amount of from about 7 to about 30% by weight.

28. The method of claim 26 wherein said water soluble salt is present in an amount of from about 3 to about 7% by weight.

29. The method of claim 26 wherein R is an alkyl radical having from about 12 to about 14 carbon atoms.

30. The method of claim 26 wherein x is from about 6 to about 8.

31. The method of claim 26 wherein $R_1$ has from about 12 to about 14 carbon atoms.

32. The method of claim 26 wherein Z and $Z_1$ are hydrogen.

33. The method of claim 26 wherein Z is hydrogen and $Z_1$ is a methyl group.

34. The method of claim 26 wherein Z and $Z_1$ are methyl groups.

35. The method of claim 26 wherein said water soluble salt comprises a cation selected from the class consisting of alkali metal ions, ammonium ion and mixtures thereof.

36. The method of claim 26 wherein said divalent acid is selected from the class consisting of carbonic acid, sulfuric acid and mixtures thereof.

37. The method of claim 26 wherein said alkyl aryl sulfonate comprises sodium tridecylbenzene sulfonic acid.

38. The method of claim 26 wherein said salt comprises sodium sulfate.

39. The method of claim 26 wherein said sulfonate, said water soluble salt and said aqueous medium are added together.

* * * * *